Nov. 10, 1959     A. PERSGARD     2,912,229
VEHICLE IMPEDING DEVICE
Filed June 30, 1958
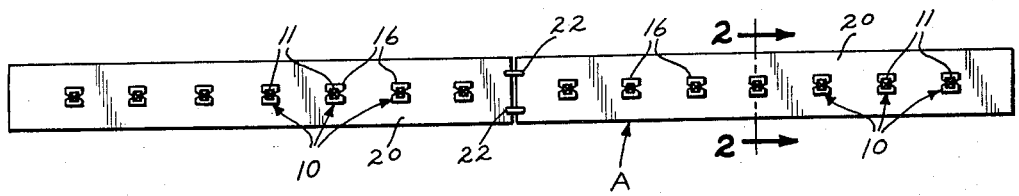
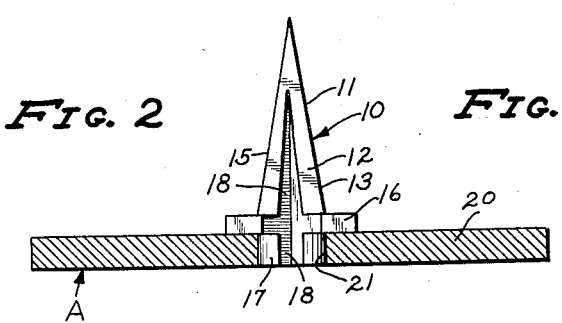
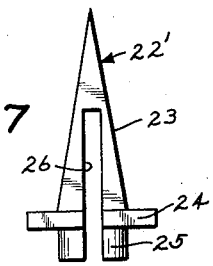
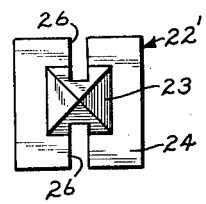
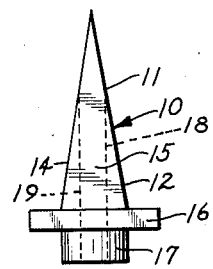
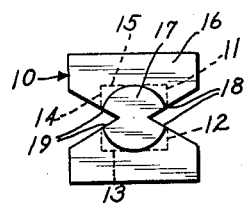
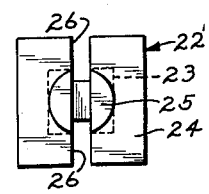
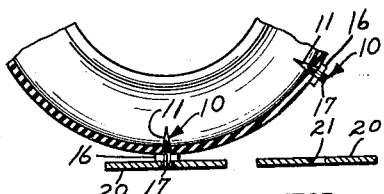
INVENTOR.
ARTHUR PERSGARD
BY
ATTORNEY

# United States Patent Office 2,912,229
Patented Nov. 10, 1959

2,912,229

VEHICLE IMPEDING DEVICE

Arthur Persgard, Duluth, Minn.

Application June 30, 1958, Serial No. 745,344

4 Claims. (Cl. 256—1)

My invention relates to an improvement in a device for stopping vehicles and more particularly to a device which is laid upon a road and which punctures a pneumatic tire when the same is driven over the device.

With the advent of modern self-sealing tires, it has become necessary to impede the progress of a vehicle, by not only puncturing a tire, but also by letting the air out.

It is therefore an object of my invention to provide a device which imbeds itself in a tire when driven upon and which causes the air in the tire to escape thereby impeding the progress of the vehicle on which the tire is mounted.

It is a further object of my invention to provide a tire puncturing device which is correctly positioned for positive pickup by a tire passing over the same, and which is easily and quickly positioned on a road, or area likely to be traveled by a vehicle.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1 is a top plan view of my spike studded mat device in extended position for use.

Figure 2 is a section on the line 2—2 of Figure 1 with the spike shown in full line.

Figure 3 is a side view of the spike member of my device.

Figure 4 is a bottom view of the spike.

Figure 5 is a top plan view of the spike.

Figure 6 is a side view of a tire upon my device illustrating how my spikes are picked up from the spike holding mat.

Figure 7 illustrates a further form of my spike.

Figure 8 is a top plan view of the device shown in Figure 7.

Figure 9 is a bottom plan view of the device shown in Figures 7 and 8.

My vehicle impeding unit device A includes as part of the unit, the spike 10 which has the elongated pyramidal formation 11 formed of the sides 12, 13, 14, and 15. The formation 11 extends upwardly from the substantially rectangular collar portion 16. The collar portion 16 is substantially at right angles to the vertical axis of the pyramidal formation. Depending from the under surface of the collar 16 is the cylindrical base portion 17.

The numeral 18 designates a fluting or elongated V-cut, which extends through the base 17, the collar 16, and the side 12 of the pyramidal formation 11. Any one of the other sides 13, 14 or 15 may be similarly fluted such as 14, which has the elongated V-cut 19 extending through the base 17, the collar 16 and the side 14. The flutes or cuts 18 and 19 may also be semi-circular in formation or any other cross section whereby a cut is made. Further, one cut may be made in one side or all sides of the formation 11 may be cut with the cut extending throughout the collar 16 and the base 17.

The cuts or flutes 18 and 19 form air passageways when the spike is picked up by a tire, the cut extending through the body of the tread of the tire and up into the air chamber of the tire whereby air is caused to pass out of the tire.

In order that the spike 10 is in proper upright position for positive engagement by a tire as it passes onto the spike, I provide the elongated semi-flexible mat 20 which has formed therein the series of spaced holes or sockets 21 of a cross-sectional area substantially that of the base 17 to releasably receive the base 17. With the base 17 of the spike 10 in position in a hole 21 of the mat member 20, the same is held upright and may be easily picked up from the hole 21 by a tire engaging the same.

I provide two mats 20 hinged together by the pair of rings 22 and having the spaced spikes 10 in place thereon. When storing the mats, one may be placed upon the other.

In Figure 7 is illustrated a further form of my spike indicated as 22' and the same includes the pyramidal spike portion 23 terminating at the lower end in the extension or collar member 24, and depending from the collar member 24 is the cylindrical base portion 25. I further provide the single passageway or kerf 26 which is formed through the base 25, the extension 24 and into the spike portion 23 and stopping at a point removed from the upper tip of the portion 23. The collar-like extension 24 may consist of one or more small members extending from the base of the spike portion 23 or 11 and not a full collar-like formation. The spike 22' is positioned in the recess of the mat 20 and when a tire is run over the same, the kerf 26 extends through the tread of the tire and up into the air chamber of the tire thereby allowing air to pass out of the tire.

In use, one or more of my mats 20 can be placed by police or others across a highway likely to be traversed by a person fleeing the law in a pneumatic tired vehicle. It may, of course, be used to impede the progress of an enemy vehicle having pneumatic tires. So used, one of the spikes 10 in only one tire could stop or slow down a vehicle by complete deflation of the one tire. My device may be easily and compactly stored by placing one mat upon the other, and conveniently placed in a flat box-like container.

In the event my device is laid upon a road or area and not encountered by a vehicle, the spikes are easily picked up as a unit when in the mat 20, and it is an easy matter to check if any of the spikes are left upon the area by simply ascertaining if all the spikes are in place in all the sockets 21. With all the spikes easily and quickly picked up, the area may be quickly used by friendly vehicles; however, where individual tacks or puncturing devices are scattered about an area, it is difficult or well nigh impossible to quickly pick up and account for all the same.

The invention is not to be understood as restricted to the details set forth since these may be modified within the scope of the appended claims without departing from the spirit and scope of the invention.

Having thus described the invention, what I claim as new and desire to secure by Letters Patent is:

1. In a vehicle impeding device, a vertical spike member having a pointed body portion secured to a horizontally disposed collar portion, said collar portion having a base portion extending therefrom said base having vertical and parallelly disposed wall surfaces, and an elongated cut extending longitudinally through the surface of said base portion, said collar and into the surface of said pointed body portion.

2. In a vehicle impeding device, the combination of a spike member having a pointed body portion secured to a collar portion, said collar portion having a base portion extending therefrom, an elongated cut extending through said base portion, said collar and into said pointed body portion, and a mat having sockets formed therein of a cross-sectional area adapted to releasably receive said base portion of said spike and support said spike in an upright position for removal from a socket.

3. In a vehicle impeding device, the combination of a spike member having a pointed body portion and a base portion, a passageway extending through said base portion and into said pointed body portion, and a mat having sockets formed therein adapted to releasably receive said base portion of said spike and support said spike in an upright manner for removal therefrom by engagement with a vehicle tire.

4. In a vehicle impeding device, a spike member having a pointed body portion and a base portion, an extended formed intermediate of said pointed body portion and said base portion, and a passageway formed in said base portion and through said extended portion and into said pointed body portion.

References Cited in the file of this patent

UNITED STATES PATENTS 2,466,707     Janney _____ Apr. 12, 1949

FOREIGN PATENTS 322,224     Great Britain _____ Dec. 2, 1929
593,355     Germany _____ Feb. 24, 1934